US009860767B2

United States Patent
Sorrentino et al.

(10) Patent No.: US 9,860,767 B2
(45) Date of Patent: Jan. 2, 2018

(54) INTERFERENCE SIGNALING METHOD FOR DEVICE-TO-DEVICE OPERATION

(71) Applicant: Telefonaktiebolaget LM Ericsson (publ), Stockholm (SE)

(72) Inventors: Stefano Sorrentino, Solna (SE); Bengt Lindoff, Bjärred (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/110,182

(22) PCT Filed: Jan. 26, 2015

(86) PCT No.: PCT/SE2015/050070
§ 371 (c)(1),
(2) Date: Jul. 7, 2016

(87) PCT Pub. No.: WO2015/115969
PCT Pub. Date: Aug. 6, 2015

(65) Prior Publication Data
US 2016/0337877 A1 Nov. 17, 2016

Related U.S. Application Data

(60) Provisional application No. 61/933,591, filed on Jan. 30, 2014.

(51) Int. Cl.
*H04W 24/02* (2009.01)
*H04L 29/06* (2006.01)
(Continued)

(52) U.S. Cl.
CPC ............ *H04W 24/02* (2013.01); *H04L 5/005* (2013.01); *H04L 69/28* (2013.01); *H04W 24/10* (2013.01);
(Continued)

(58) Field of Classification Search
CPC ........ H04L 5/005; H04L 69/28; H04W 24/02; H04W 24/10; H04W 56/0015;
(Continued)

(56) References Cited

U.S. PATENT DOCUMENTS

| 2010/0093364 A1 | 4/2010 | Ribeiro et al. |
| 2011/0098043 A1* | 4/2011 | Yu .................. H04W 60/00 455/435.1 |

(Continued)

FOREIGN PATENT DOCUMENTS

WO  2012159270 A1  11/2012

OTHER PUBLICATIONS

Fodor, G. et al., "Design Aspects of Network Assisted Device-to-Device Communications", IEEE Communications Magazine, Mar. 1, 2012, pp. 170-177, IEEE.

(Continued)

*Primary Examiner* — Kashif Siddiqui
(74) *Attorney, Agent, or Firm* — Coats & Bennett, PLLC

(57) ABSTRACT

The present disclosure relates to methods with regards to D2D communication. According to one aspect, this disclosure proposes method of interference mitigation, performed in a network node in a cellular communication system the network node serving a wireless device supporting device-to-device, D2D, communication. The method comprises receiving S1 from the wireless device, at least one control message comprising resource allocation information associated with D2D transmissions of other wireless devices, which transmissions are obtained by the wireless device. The method further comprises utilizing S2 the received resource allocation information when allocating resources and/or providing the received information to network nodes of neighbor cells and/or to wireless devices served by the network node for utilization when allocating resources.

(Continued)

Because the network node retrieves information about the D2D environment, resource allocation and synchronization may be optimized. The disclosure also relates to the corresponding method in a wireless device supporting D2D communication and to corresponding devices and to a computer program for executing the proposed methods.

21 Claims, 7 Drawing Sheets

(51) Int. Cl.
| | |
|---|---|
| H04L 5/00 | (2006.01) |
| H04W 24/10 | (2009.01) |
| H04W 56/00 | (2009.01) |
| H04W 72/08 | (2009.01) |
| H04W 72/12 | (2009.01) |
| H04W 72/04 | (2009.01) |
| H04W 76/02 | (2009.01) |
| H04W 84/04 | (2009.01) |

(52) U.S. Cl.
CPC ..... *H04W 56/002* (2013.01); *H04W 56/0015* (2013.01); *H04W 72/04* (2013.01); *H04W 72/082* (2013.01); *H04W 72/1215* (2013.01); *H04W 72/0406* (2013.01); *H04W 76/023* (2013.01); *H04W 84/042* (2013.01)

(58) Field of Classification Search
CPC ............... H04W 56/002; H04W 72/04; H04W 72/0406; H04W 72/082; H04W 72/1215; H04W 76/023; H04W 84/042
See application file for complete search history.

(56) References Cited

U.S. PATENT DOCUMENTS

| | | | |
|---|---|---|---|
| 2011/0106952 A1* | 5/2011 | Doppler | ............ H04W 72/0406 709/226 |
| 2012/0014334 A1 | 1/2012 | Oh et al. | |
| 2014/0094183 A1* | 4/2014 | Gao | .................... H04W 72/048 455/450 |

OTHER PUBLICATIONS

Qualcomm Incorporated, "Cover sheet for TR 36.843 v1.0.0 on "Study of LTE Device to Device Proximity Services-Radio Aspects"", 3GPP TSG-RAN WG1 #75, Nov. 11, 2013, p. 1, R1-135998, 3GPP, San Francisco, USA.

3rd Generation Partnership Project, "3rd Generation Partnership Project; Technical Specification Group Services and System Aspects; Feasibility study for Proximity Services (ProSe) (Release 12)", Technical Report, 3GPP TR 22.803 V12.2.0, Jun. 1, 2013, pp. 1-45, 3GPP.

3rd Generation Partnership Project, "3rd Generation Partnership Project; Technical Specification Group RAN; Study on LTE Device to Device Proximity Services-Radio Aspects; (Release 12)", Technical Report, 3GPP TR 36.843 V1.0.0, Nov. 1, 2013, pp. 1-32, 3GPP.

* cited by examiner

INTERFERENCE SIGNALING METHOD FOR DEVICE-TO-DEVICE OPERATION

TECHNICAL FIELD

The present disclosure relates to Device-to Device, D2D, communication and to optimizing resource allocation and to radio resource management algorithms taking into account the resources used by neighbour D2D devices. In particular the present disclosure relates to methods of interference mitigation with regards to D2D communication. The disclosure also relates to corresponding devices and to a computer program for executing the proposed methods.

BACKGROUND

Device-to-device, D2D, communications in the cellular spectrum is a relatively new concept that targets scenarios in which communicating parties are in the close proximity of each other, see G. Fodor et al, "Design Aspects of Network Assisted Device-to-Device Communications", IEEE Communications Magazine, March 2012. An advantage with using D2D communication is that the capacity of a radio communication network as a whole is increased without a corresponding impact on cellular infrastructure. Thus, the infrastructure radio communication network may be offloaded in terms of traffic between wireless devices.

Moreover, D2D communication enables infrastructureless communication between wireless devices. This may be of importance in, for example, emergency, national security and public safety situations, since during these situations load on the radio communication network(s) is generally high. Furthermore, an emergency situation may for example occur where only limited coverage by the radio communication system is provided. In such a situation, D2D communication may improve coverage by allowing wireless devices within an area to communicate with each other. In addition, local communication between wireless devices using D2D communication is achievable without a need for radio coverage by the radio communication system or in general, the radio coverage of a cellular infrastructure independently whether the infrastructure comprises one radio access technology, RAT, or a plurality of RATs.

Recently, D2D communications as a complement to cellular networks have been proposed as a means to take advantage of the proximity of communicating devices and at the same time to allow devices to operate in a controlled interference environment. Typically, it is suggested that device-to-device communication shares the same spectrum as the cellular system, for example by reserving some of the cellular uplink resources for D2D purposes. Allocating dedicated spectrum for D2D purposes is a less likely alternative as spectrum is a scarce resource and dynamic sharing between the device-to-device services and cellular services is more flexible and provides higher spectrum efficiency.

D2D devices that want to communicate, or even just discover each other, typically need to transmit various forms of control signaling. One example of such control signaling is the so-called discovery message, which at least carries some form of identity and is transmitted by a device that wants to be discoverable by other devices. Other devices can scan for the discovery message. Once the D2D devices have detected the discovery message, they can take the appropriate action, for example to try to initiate a connection setup with the device transmitting the discovery message.

Some D2D devices can transmit control signaling, i.e. discovery messages as well as other types of control signaling, simultaneously. The transmissions from the different devices may be time synchronized i.e. mutually time-aligned, or unsynchronized. Synchronization could be obtained for example by receiving appropriate signals from the overlaid cellular network, or from a global navigation satellite system such as GPS. According to ProSe requirements as specified in see 3GPP SA1 ProSe technical report, TR 22.803 V12.2.0 (2013-06) user equipments belonging to one cell need to be able to discover user equipments camping on another cell.

Another scenario arises when user equipments are in physical proximity, but camp on different public land mobile networks, PLMNs, or different carriers, because, while discovery messages transmitted within a cell are typically synchronized to a cell-specific reference, different cells/carriers/PLMNs networks are in general unsynchronized. In other words, from a D2D communication perspective, there are no cell boundaries and user equipments need to track multiple synchronization references.

The above mentioned ProSe technical report recommends supporting D2D operation for out of network coverage user equipments as well as for belonging to one cell. In such case, different synchronization options are possible: user equipments may synchronize to a global reference e.g. a GPS, which is in general different from the synchronization reference of deployed networks. Possibly user equipments may also operate in a fully asynchronous fashion without any synchronization reference, at least for discovery. A further option is that clusters of user equipments synchronize to a specific user equipment, in the following called as Cluster Head, CH, which provides local synchronization to its neighbor user equipments. Different clusters are not necessarily synchronized.

To convey information about out of network D2D devices, user equipments may discover D2D signals with an arbitrary synchronization on a given carrier (or sub band) by searching for D2D signals in time. This can be done, e.g. by time domain correlation of the received signal with the D2D signal waveforms, similarly to the way user equipments search for cells using the primary and secondary synchronization signals, PSS, SSS as defined in the LTE standard.

User equipments alternate wake up and sleep cycles for reducing power consumption, referred to as discontinuous reception, DRX. During sleep periods, only the memory and clocks are active, but the user equipment is unable to receive any signal. During wake up time, the receiver is on. It is essential that the wake up times are as narrow as possible compared to the sleep time in order to save battery.

However, searching for D2D signals by scanning the radio environment entails high energy consumption at the receiver, since the receiver needs to be kept active or awake over a prolonged time. Furthermore, in such a system resource allocation and radio resource management algorithms are problematic because resources used by neighbor D2D user equipments may potentially interfere strongly with the user equipments camping on the cell.

Hence, there is a need for radio resource management and interference mitigation methods overcoming the above mentioned problems to further improve the advantages of D2D communications.

SUMMARY

The disclosure consists, in its basic embodiment, of methods of obtaining information about D2D resources associated to other user equipments in the proximity of a wireless device configured for D2D communication and reporting such information to the serving network node. The information is then received by a network node and used in order to improve D2D communication e.g. in respect of interference and/or power consumption. The proposed methods allows a radio network node such as an eNodeB in LTE to be aware of the D2D resources that produce interference to D2D devices in the own cell, by letting D2D devices report information about obtained D2D transmissions to a network node by which it is served. Such reporting allows the user equipment to minimize the discontinuous reception cycle and to reduce the need for continuously searching for D2D resources in neighbour cells, clusters or user equipments.

According to one aspect, this disclosure proposes method of interference mitigation, performed in a network node in a cellular communication system the network node serving a wireless device supporting device-to-device, D2D, communication. The method comprises receiving from the wireless device, at least one control message comprising information associated with D2D transmissions of other wireless devices, which transmissions are obtained by the wireless device. The method further comprises utilizing the received resource allocation information when allocating resources and/or providing the received resource allocation information to network nodes of neighbor cells and/or to wireless devices served by the network node for utilization when allocating resources. According to some aspects, the at least one control message defines a set of resources configured, by neighbor devices, for potentially transmitting different D2D signals.

Because the network node retrieves information about the D2D environment, resource allocation and synchronization may be optimized. According to one aspect, the at least one control message further comprises synchronization information relating to at least one obtained D2D transmission. Such information may be used by the network node to e.g. adjust the eNodeB synchronization in order to align it with neighbor synchronization references. Also, depending on the type of deployment and resource scheduling, the eNodeB might wish to align D2D resources and have D2D-to-D2D interference instead of mixed interference. For example, the synchronization information comprises at least one time offset between a time reference of the network node and least one obtained D2D transmission.

According to some aspects, utilizing the received resource allocation information when allocating resources implies, coordinating resources in respect of at least one wireless device to facilitate switching between reception from and/or transmission to other wireless devices. Hence, switching between communication with different D2D devices may be facilitated in terms of e.g. time or hardware requirements.

Hence, the at least one control message further comprises resource allocation information relating to at least one obtained D2D transmission. The eNB may consider when scheduling cellular and/or D2D data that some resources are potentially subject to hardly predictable D2D interference and as such should be avoided or used in a conservative way e.g. with reduced spectral efficiency than other "normal" resources.

According to one aspect, the method further comprises sending to the wireless device a request for the wireless device to report the D2D interference scenario. By sending a request to report the D2D interference scenario, the network node can control when to receive resource allocation information about D2D transmissions. The network node may also request what information to receive, and from which device to receive the information.

According to one aspect, utilizing received information when allocating resources implies restricting use of the resources potentially subject to D2D interference when allocating resources for D2D and/or cellular traffic in the network node. Hence, resources subject to interference may be avoided, wherein efficiency is increased and power may be saved.

According to one aspect, the method further comprises receiving from at least one network node of neighbor cell resource information about D2D resources potentially subject to D2D interference, wherein the resource allocation in the network node is based on both information received from wireless devices and on information received from network nodes of a neighbor cells.

According to one aspect, the disclosure relates to a computer program, comprising computer readable code which, when run in a network node, causes the network node to perform the method described above.

According to another aspect the disclosure further relates to a method of enabling interference mitigation, performed in wireless device supporting device-to-device, D2D, communication, the wireless device being served by a network node in a cellular communication system. The method comprises obtaining one or more D2D transmissions of other wireless devices, and sending, to the network node, at least one control message comprising resource allocation information associated with the obtained one or more D2D transmissions. The method thereby enables restricted use of resources potentially subject to D2D interference when allocating resources for D2D and/or cellular traffic in the network node.

According to one aspect, the at least one control message further comprises synchronization information relating to at least one obtained D2D transmission. According to one aspect, the synchronization information comprises at least one time offset between a time reference of the network node and least one obtained D2D transmission.

Hence, the at least one control message further comprises resource allocation information relating to at least one obtained D2D transmission.

According to one aspect, the control message comprises information about wireless devices supporting D2D communication or D2D resources not known by the network node. Hence, the wireless device, may scan for resources, but only report a selection of the retrieved information.

According to one aspect, the control message comprises information about newly obtained devices wireless devices supporting D2D communications and/or D2D resources.

According to one aspect, the control message comprises information about other wireless devices supporting D2D communications that are served by neighbor cells or cluster heads.

According to one aspect, the method further comprises receiving from the network node a request for the wireless device to report D2D interference measurements, wherein the request triggers the reporting of resource allocation information associated with obtained D2D transmissions, to the network node.

According to one aspect, the method further comprises detecting a variation in interference, wherein detection of a variation triggers the reporting of obtained D2D transmissions to the network node.

According to one aspect, the method further comprises receiving from the network node, information about D2D resources, known to the network node, being used by wireless devices supporting D2D communications served by neighbor cells or cluster heads. By receiving this type of information, the need for scanning for D2D transmissions may be reduced and power is saved.

According to one aspect, the control message is an interference report or a measurement report.

According to one aspect, the step of obtaining comprises scanning the radio environment for synchronization reference signals transmitted by other network nodes or wireless devices supporting D2D communications.

According to another aspect the disclosure further relates to a computer program, comprising computer readable code which, when run in a wireless device supporting D2D communication causes the wireless device to perform the method described above.

According to another aspect the disclosure further relates to a wireless device supporting D2D communication and being configured to of enabling interference mitigation. The wireless device comprises radio communication interface configured for communication with the network node, and for D2D communication with other wireless devices supporting D2D communications and processing circuitry. The processing circuitry is configured to cause the wireless device to; obtain, using the radio communication interface, one or more D2D transmissions of other wireless devices supporting D2D communications and send, using the radio communication interface, to the network node, at least one control message comprising information associated with the obtained one or more D2D transmissions, thereby enabling restricted use of resources potentially subject to D2D interference when allocating resources for D2D and/or cellular traffic in the network node.

According to another aspect the disclosure further relates to a network node, in a cellular communication system, the network node being configured for interference mitigation. The network node comprises a radio communication interface configured for communication with a wireless devices supporting D2D communication and a network communication interface configured for communication with other network nodes. The network node further comprises a processing circuitry configured to cause the network node to receive, using the radio communication interface, from a wireless device, at least one control message comprising information associated with D2D transmissions of other wireless devices, which transmissions are obtained by the wireless device, and to utilize the received information when allocating resources and/or providing the received information to network nodes of neighbor cells and/or to wireless devices served by the network node for utilization when allocating resources.

With the above description in mind, the object of the present disclosure is to overcome at least some of the disadvantages of known technology as previously described.

BRIEF DESCRIPTION OF THE DRAWINGS

The present technique will be more readily understood through the study of the following detailed description of the embodiments/aspects together with the accompanying drawings, of which.

DETAILED DESCRIPTION

Figure 1A:
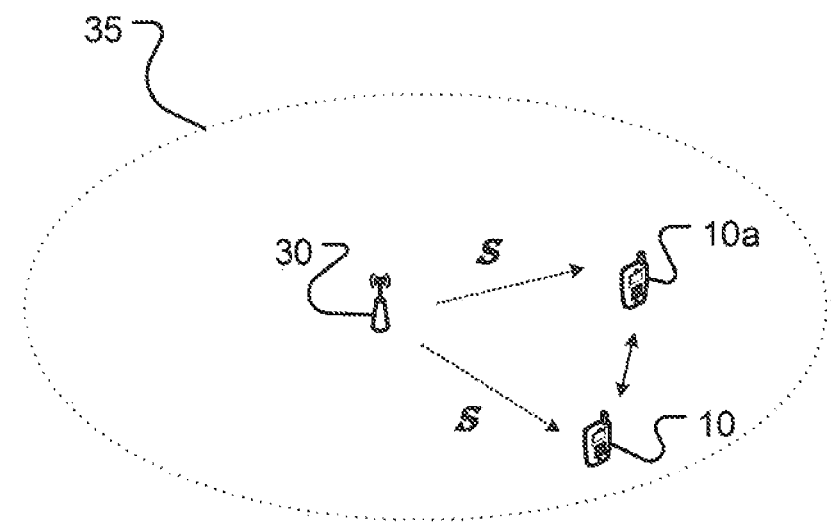
FIG. 1a illustrates network assisted device-to-device communication.

As described above, in D2D communication it is advantageous for the network to optimize resource allocation and radio resource management algorithms taking into account the resources used by neighbor D2D devices, since such D2D devices potentially interfere strongly with the D2D devices camping on the cell. Furthermore, resource coordination between carriers may be desirable, because a single device might want to communicate with more than one other D2D device.

One solution to these problems is to convey information about neighbor cells over backhaul. However, in case of out of coverage user equipments this is clearly not possible. Additionally, for asynchronous deployments, information about resource allocation in neighbor cells can be obtained up to a certain uncertainty). However, such uncertainty may not allow inter-cell interference coordination in practical scenarios.

Thus, the inventors have realized that the resource allocation problems may be solved by letting D2D devices within network coverage report measurements associated with proximity D2D devices to their serving cell. If further information, such as synchronization information and resource information, is included in the signaled information and forwarded to all devices in a cell, further effects may be achieved. For example, the above mentioned scanning for out of network D2D devices may be reduced, which would reduce power consumption of D2D devices.

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

Hence, this disclosure proposes a method performed in a D2D device of obtaining information about D2D resources associated to other D2D devices in its vicinity and reporting such information to the serving network node. The serving network may then perform further actions such as adjusting the resource allocation for D2D and/or cellular traffic in order to better cope with interference originated from D2D communication in other cells or out of network coverage. The resources allocated to different devices may e.g. be allocated such that switching between reception and/or transmission with different devices is optimized. For example, if it is known that one wireless device is communicating with two different wireless devices, then the resources used for communication may be located in the same or adjacent frequency bands.

The resource allocation information may also be distributed within the cell and to neighbor cells, wherein D2D devices do not need to perform searches for proximity D2D devices, but simply receives such information from the network side.

Embodiments of the present disclosure relate, in general, to D2D communication in a LTE system. However, it must be appreciated that the proposed methods may be implemented in any cellular system using D2D communications as an underlay to cellular networks. In this disclosure the term D2D device refers to a wireless device, such as a user equipment, that is supporting D2D communication.

In order to further describe the proposed technique, some basic principles of D2D communication will now be described referring to FIGS. 1a and 1b. FIG. 1a illustrates two D2D devices, 10a, 10b, capable of D2D communication in a cell 35, defined by a base station 30 and its transmitted power, of a mobile communication network. In this example D2D communication is utilizing the licensed spectrum such as the LTE spectrum. As mentioned above, D2D communication or direct communication, DC, can be assisted by the cellular network infrastructure when it is available. In network assisted D2D communication both devices, 10a, 10, are synchronized to the same network entity, typically a base station 30. This possibility is illustrated by the dashed arrows S in FIG. 1a.

In general, synchronization in D2D communication can take place on many levels. In an orthogonal frequency division multiplexing, OFDM, based system such as LTE, the synchronization signals are reference signals designed with such properties to enable sufficiently accurate time and/or carrier frequency synchronization. Time synchronization means that the receiver node is able to determine the exact time instant at which the OFDM message starts. Frequency synchronization means that the transmitter and receiver use equal carrier frequencies and frequency spacing for their respective subcarriers. In LTE, the Primary Synchronization Signal, PSS, Secondary Synchronization Signal, SSS, and Cell-specific Reference Signal, CRS, signals are typically exploited by wireless devices for synchronization.

Synchronization reference signals are characterized by a predefined mapping to time/frequency resources according to a certain predefined pattern. Furthermore, each reference signal consists of one of a plurality of predefined sequences having properties that make them suitable for synchronization and channel estimation. Each of such sequences is identified by one or more sequence index. The patterns and sequences are predefined according to e.g. LTE the specifications.

However, sometimes it is desirable to perform device-to-device communication in an ADHoc and autonomous fashion in case the cellular network is lacking. This may also be desired for the purpose of off-loading the cellular network. Specifically, in 3GPP LTE networks, such LTE direct communication can be used in commercial applications, such as proximity based social networking or in public safety situations in which first responders need to communicate with each other and with people in the disaster area, see 3GPP SA1 ProSe technical report, TR 22.803 V12.2.0 (2013-06).

Hence, even in the ADHoc case, some level of synchronization is required, between a transmitter and a receiver in D2D communication, e.g. between wireless devices. The level and accuracy of synchronization required varies with the type of service intended to be pursued in the D2D communication. However, for any radio communication link, synchronization is required for enabling a receiver to decode information content transmitted by a transmitter.

Considering the scenario where a network infrastructure is unavailable or damaged e.g. for public safety purposes, a global sync reference might not be available. This triggers the need of direct synchronization. Direct synchronization consists of synchronizing a wireless device's radio access to a local synchronization reference provided by another device, instead of the cellular network, e.g. the sync signals from the eNodeB. Direct synchronization may be enabled for devices that need to communicate directly but are outside coverage of a network.

Figure 1B:
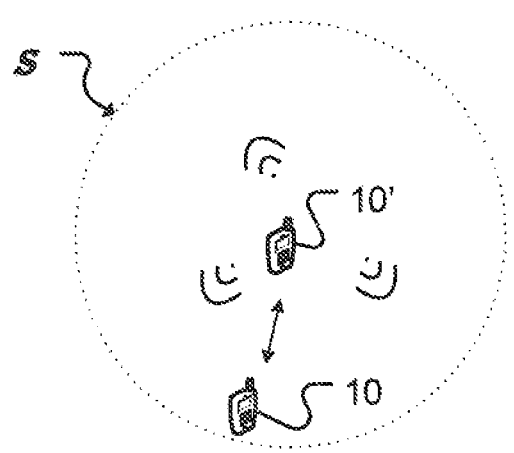
FIG. 1b illustrates ad hoc device-to-device communication.

FIG. 1b schematically illustrates a mobile communication network including two wireless devices, 10, 10', capable of device-to-device communication. In direct synchronization, a synchronization reference signal is sent by the wireless device, 10', autonomously, as illustrated by the dashed line S in FIG. 1b. A wireless device sending out a synchronization reference signal S is referred to as a cluster head 10'. The synchronization reference signal S is used to derive the timing and/or the frequency reference for the control communication or data transmission. For this reason, high accuracy and relatively large bandwidth is needed for the transmission of a synchronization reference signal S.

For resource management in D2D communication, there are different possible scenarios. In the case where the network configures periodic or sparse in time resources for transmission of D2D signals and messages. Discovery messages used for discovery of devices in proximity are one example of D2D messages.

In case of lack of coverage, at least two other possibilities may be considered:
  A D2D device with special control authority i.e. a cluster head, CH as described above, assigns D2D resources to other D2D devices or
  D2D devices decide autonomously on which resources to transmit D2D, possibly within a subset of preconfigured resources (e.g., a certain sub band). Nevertheless, synchronization might be derived from a third D2D device.

Devices located in the same cell i.e. served by or camping on the same cell, typically derive synchronization from the downlink signals in that cell. This ensures that transmissions from different devices are time synchronized and, consequently, reception at a given device is roughly synchronized.

Possibly, the D2D device is aware, or it is made aware by the network or CH, of the set of resources in time where D2D signals are expected, including neighbor cells/clusters. Such resources might be defined according to a regular or somehow predefined pattern. Such neighbor cells may correspond to different cells of same PLMN, different carriers, different PLMNs or even different RATs. The time (and possibly frequency) resources where D2D signals are expected are defined with respect to the timing reference of the corresponding cell/cluster. However, such timing may be different from the timing of the cell/cluster on which the D2D device searching for D2D signals is camping.

As stated above, in D2D communication, it is desirable to optimize resource allocation and Radio Resource Management algorithms taking into account the resources used by neighbor D2D devices, since such devices potentially interfere strongly with the camping on the cell.

Therefore, this disclosure proposes that D2D devices connected to a serving cell report measurements associated with proximity D2D devices to their serving cell.

According to the proposed technique, the network may then, based on the reports provided by the D2D devices and possibly also on information obtained by over the air measurements and/or backhaul, perform actions such as adjusting the resource allocation for D2D and/or cellular traffic in order to better cope with interference, providing messages to neighbor cells or D2D devices within the cell that are useful for re-allocating D2D resources in an inter-cell environment. In one example embodiment this implies reducing, when possible, the overlap between resources allocated to D2D traffic and resources allocated to cellular traffic when allocating resources.

Figure 2A:
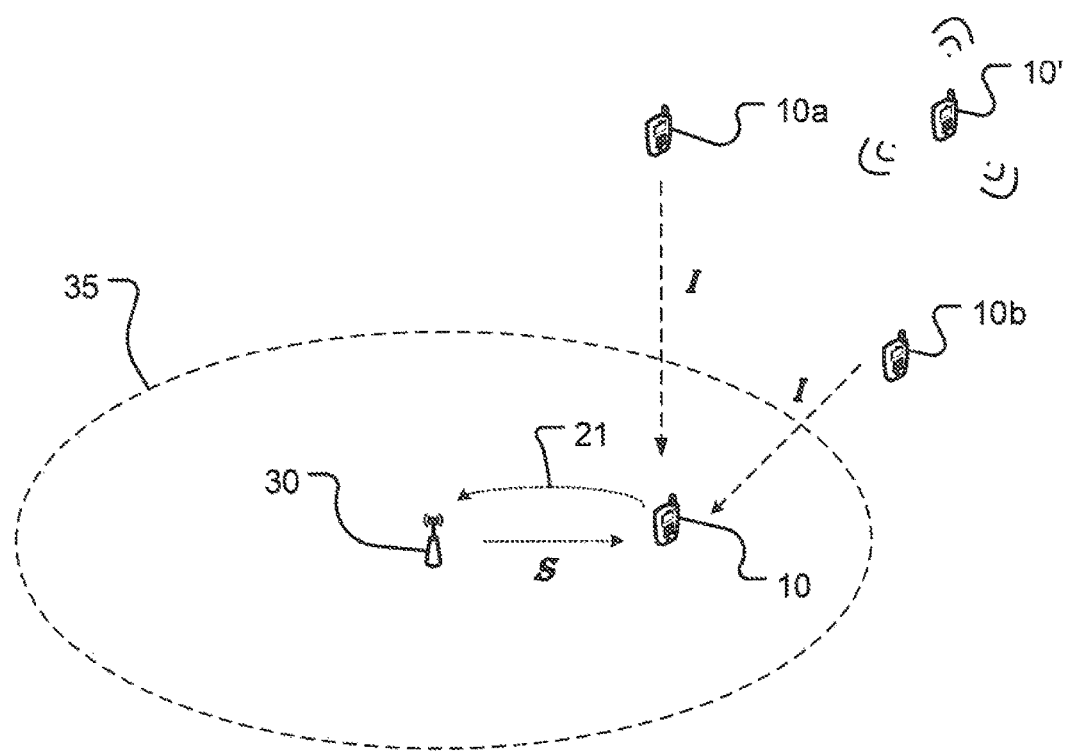
FIG. 2a illustrates a wireless network comprising one radio network node and several D2D devices, where the proposed method is implemented.

FIG. 2a illustrates a wireless network comprising one radio network node and several D2D devices, where the proposed method is implemented. In this example a D2D device is served by a network node 30 e.g. an eNodeB. The eNodeB 30 transmits a synchronization reference signal S, which is used by the D2D device 10. It is assumed that the cellular and the D2D transmissions utilise the same spectrum and are thus potentially interfering. In this example there are two other D2D devices 10a, 10b within the reach of D2D device 10. These devices are synchronised with cluster head 10'. However, these devices may potentially cause interference I within the cell 35.

Figure 4:
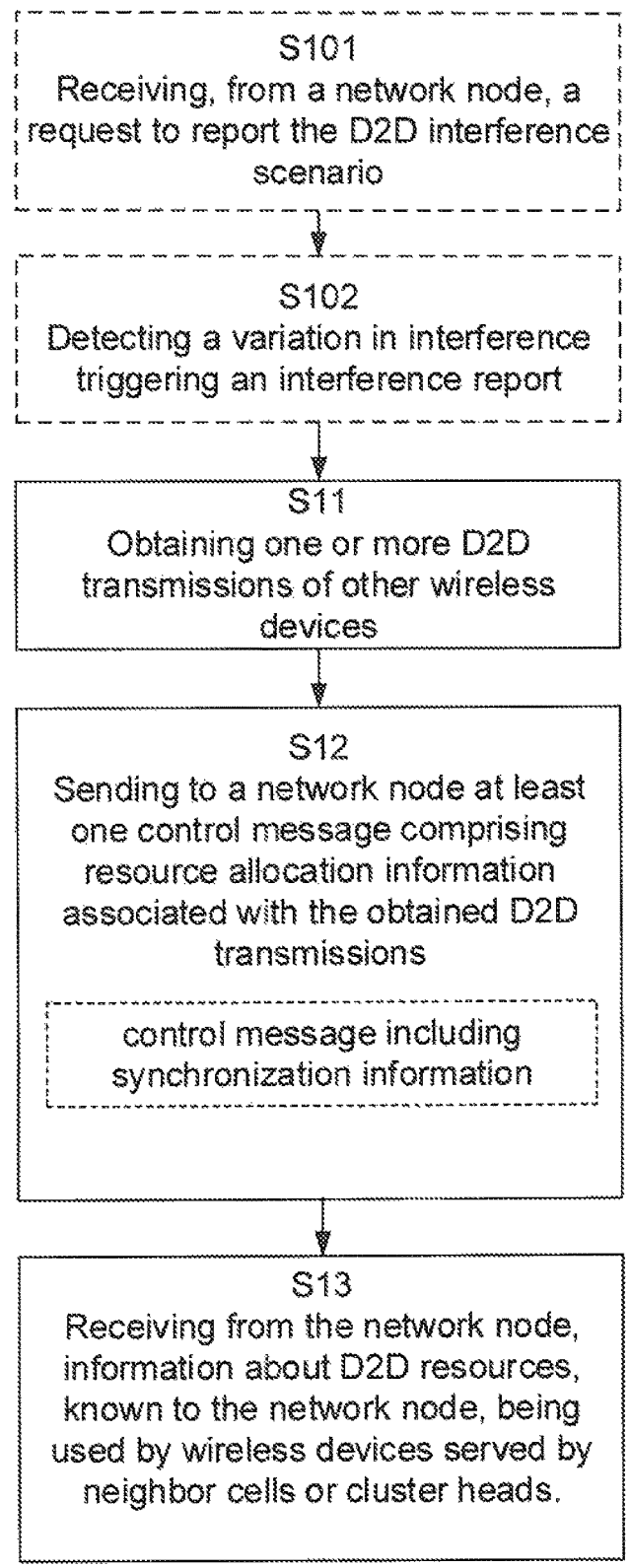
FIG. 4 is a flow chart illustrating the proposed method performed in a wireless device.

The proposed method, of interference mitigation, performed in the network node 30 in a cellular communication system, the network node 30 serving a wireless device 10 supporting device-to-device, D2D, communication, comprises a number of steps that will now be described referring to FIG. 4.

In the step S1 of the proposed method performed in the network node 30, the network node 30 receives, from a wireless device 10 supporting D2D communications, at least one control message 21 comprising resource allocation information associated with D2D transmissions of other wireless devices, which transmissions are obtained by the wireless device. Stated differently, the wireless device reports to the network node information used for D2D transmissions by other D2D devices, e.g. in its vicinity. Obtained or detected implies that the wireless device has discovered or identified the presence or existence of the D2D transmissions. The resource allocation information is e.g. a measurement report or interference report. According to one aspect, the D2D device scans the radio environment for D2D transmissions and then shares the result with the network node, by which it is served. The resource allocation information comprises e.g. information about which devices are detected, where they are positioned and which resources they use for D2D communication.

According to one aspect, the at least one control message may define a set of resources configured for potentially transmitting different D2D signals by neighbor D2D devices. Information about such matrix may be obtained in the wireless device, e.g. by control information broadcasted by such neighbor D2D devices or blindly detected by over the air measurements, as will be further explained below. The at least one control message may consist of information defining the resources configured for each type of D2D signals/channels e.g. resources for discovery, resources for synchronization signals or resources for communication.

In step S2, the network node 30 utilizes the received resource allocation information when allocating resources and/or provides S3, S4 the received resource allocation information to network nodes 30a of neighbor cells 35a and/or to wireless devices served by the network node 30 for utilization when allocating resources. Hence, the received information is usable within the network node 30 in order to better cope with interference originated from D2D communication in other cells/out of network coverage. Once, this information is reported to a node in the network it may be used in different ways all over the network, which will further be described below.

For example the information about other D2D transmissions may be used when allocating resources in the base station. According to one aspect, the at least one control message 21 comprises resource allocation information relating to at least one detected D2D transmission. Resource allocation information is e.g. in LTE information about time and frequency of detected D2D transmissions. According to this aspect, the at least one control message may define a set of resources configured for potentially transmitting different D2D signals by neighbor D2D devices. Information about such matrix may be obtained in the wireless device, e.g. by control information broadcasted by such neighbor D2D devices or blindly detected by over the air measurements, as will be further explained below. The at least one control message may consist of information defining the resources configured for each type of D2D signals/channels e.g. resources for discovery, resources for synchronization signals or resources for communication.

Hence, this disclosure proposes reducing, when possible, the overlap between resources allocated to D2D traffic and resources allocated to cellular traffic when allocating resources. Utilizing received information when allocating resources implies for example restricting use of the resources potentially subject to D2D interference when allocating resources for D2D and/or cellular traffic in the network node 30. Hence, the network node 30 may take into account when scheduling cellular and/or D2D data that some resources are potentially subject to hardly predictable D2D interference, i.e. interference of D2D transmissions, and as such should be avoided or used in a conservative way e.g. with reduced spectral efficiency than other "normal" resources. However, other solutions are also possible, wherein the different transmissions have different priority. Then, transmissions having low priority may be transmitted on resources potentially subject to hardly predictable D2D interference.

Utilizing received information when allocating resources implies, in another example, coordinating resources in respect of at least one wireless device 10 to facilitate switching between reception from and/or transmission to other wireless devices 10a, 10b. This implies that one wireless device e.g. 10 in FIG. 2b may want to communicate with two other D2D devices 10a, 10b. Then communication may be optimised by allocating the two channels, i.e. channel between 10 and 10a and channel between 10 and 10b, such that switching between the channels is facilitated in terms of e.g. switching time, hardware requirements etc.

According to one aspect, the at least one control message 21 further comprises synchronization information relating to at least one obtained D2D transmission. For example, the at least one control message includes at least timing information for the synchronization of neighbor D2D devices.

According to one aspect, the synchronization information comprises at least one time offset between a time reference e.g. an internal clock signal, of the network node 30 and least one obtained D2D transmission. Such time offset can be expressed, e.g., as an offset compared to the D2D device's reference timing in the serving cell, either in downlink or uplink timing. If synchronization is associated to a certain identity e.g. a synchronization source ID, the signaled timing offset can be associated to such synchronization ID, or in some cases to a local or global cell ID associated with the detected D2D resources. This information may be used to adjust the network node 30 synchronization in order to align it with synchronization references of neighbour network nodes or cluster cells. Also, depending on the type of deployment and resource scheduling, the network node 30 might wish to align D2D resources and have D2D-to-D2D interference instead of mixed interference. Thus, the network node 30 may choose to use resources that are subject to D2D interference for D2D transmissions, or for other transmissions that are e.g. less sensitive for interference or less prioritised.

Figure 2B:
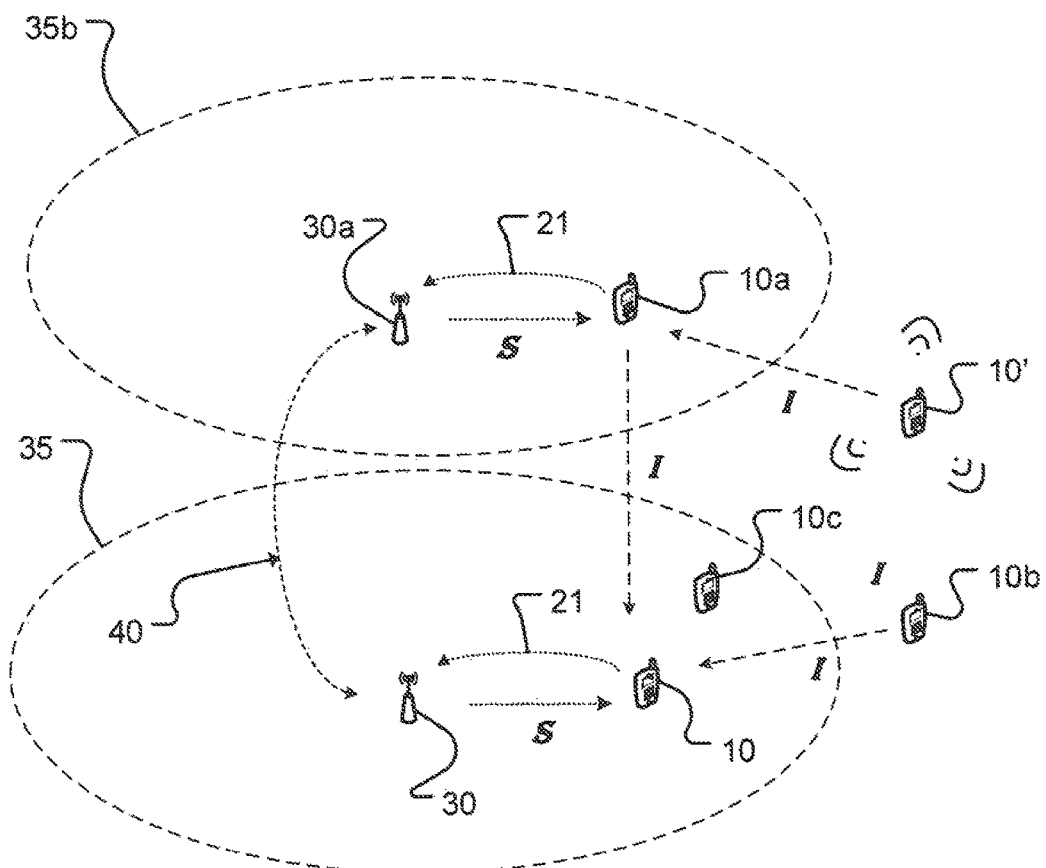
FIG. 2b illustrates a wireless network where the proposed method is implemented comprising a two radio network nodes connected over the backhaul.

Furthermore, the received information is also usable by the neighbor network nodes, as illustrated in FIG. 2*b*. FIG. 2*b* illustrates a wireless network where the proposed method is implemented comprising a two radio network nodes connected over the backhaul 40.

The network of FIG. 2*b* is similar to the one of FIG. 2*a*, with the difference that there is a second base station 30*a*. In this example the wireless device 10 detects the D2D devices 10*a*, 10*b* and 10' when scanning for D2D transmissions. However, in this example, the information about device 10' is also highly relevant to the base station 30*a*, e.g. because its transmissions may interfere with devices, within the cell 35*a* defined by network node 30*a*.

Hence, in addition to, or as alternative to using S2 the received information within the node, the network node 30 can forward it to neighbor cells e.g. to base station 30*a*. This includes e.g. indicating the D2D and/or cellular resources used in the own cell, indicating the resources sensed in the own cell but associated to neighbor D2D devices not camping on the own cell or indicating the relative time and/or frequency offset between the own cell and D2D resources associated to neighbor cells.

Additionally the received information may be usable to D2D devices 10*c* within the cell. Hence, the in addition or as alternative the D2D resources associated to neighbor D2D devices are indicated to other wireless devices 10*c* within the cell served by network node 30. In one example embodiment, the network node 30 provides information about D2D resources that the network node 30 knows are used by wireless devices served by neighbor cells 35*b* or cluster heads 10'. By doing so, the D2D devices 10*c* do not need to search for such resources as explained above and can avoid the additional energy consumption.

Different solutions can be envisioned for selecting which D2D devices and when they should report information about neighbor D2D devices D2D resources according to according to the proposed technique. According to one aspect, the method comprises, the network node 30 sending S0 to the wireless device 10 a request for the wireless device to report the D2D interference scenario. In one example, D2D devices are asked by the network to report the D2D interference scenario. Possibly, the network may task a D2D device to periodically report the D2D interference scenario. The request could also comprise information about what and/or when to report.

In another example, the D2D device autonomously reports to the network the D2D interference scenario according to the according to the proposed technique, when a variation in such interference scenario occurs. Such variation could be the appearance or disappearance of certain interferers, or changes in synchronization references. A rule is needed for defining the events that trigger a report. Such rule may be configured by the network (RRC signaled or broadcasted) or pre-configured in the D2D device.

According to one aspect, the method further comprises, receiving S1*b* from at least one network node 30*a* of a neighbor cell resource information about D2D resources potentially subject to D2D interference, wherein the resource allocation in the network node 30 is based on both information received from wireless devices and on information received from network nodes 30*a* of a neighbor cells. For example a network node 30*a* in a neighbor cell has also received, from a D2D device 10; at least one control message 21 comprising information associated with, by the D2D device obtained, D2D transmissions of other D2D devices. This information may, as explained above, be useful for neighbor network nodes. Hence according to this aspect, the network node 30 not only provides S3 the received information to network nodes 30*a* of neighbor cells 35*b*, but it also receives this type of information from neighbor network nodes 30*a*.

The information about D2D resources potentially subject to D2D interference may then be used when allocating resources as well as for synchronization purposes as described above, independently on if it is received from network nodes or from neighbor cells.

The methods of interference mitigation, performed in a wireless device 10 in a cellular communication system the network node 30 serving a wireless device 10 supporting device-to-device, D2D, communication, comprises a number of steps, which steps will now be described referring to FIG. 4.

The proposed method, of enabling interference mitigation, performed in wireless device 10 supporting device-to-device, D2D, communication, the wireless device 10 being served by a network node 30 in a cellular communication system, comprises a number of steps, which steps will now be described referring to FIG. 4.

In the step S11 of the proposed method performed in a wireless device 10, the wireless device 10 obtains S11 one or more D2D transmissions of other wireless devices 10*a*, 10*b* supporting D2D communication. Obtaining, or detecting, implies discovering or identifying the presence or existence of the D2D transmissions. The D2D resources may be obtained in a number of ways, including energy detection, successful detection of a message transmitted by a neighbor D2D device, or by reading control information regarding resource allocation transmitted by neighbor nodes. For example the obtaining implies scanning or searching the radio environment for D2D transmissions. The obtaining may, e.g. consist of identifying synchronization signals D2D Synchronization Signal, D2DSS, and/or Physical D2D Synchronization Channels, PD2DSCH. These signals are described e.g. in R1-135998, TR36.843 v1.0.0 on Study on LTE Device to Device Proximity Services-Radio transmitted by other nodes D2D devices or eNodeBs. Hence, according to one aspect, the step of obtaining S11 comprises scanning the radio environment for synchronization reference signals transmitted by other network nodes or wireless devices 10*a*, 10*b* supporting D2D communication.

In the step S12 of the proposed method performed in a wireless device 10, the wireless device 10 sends, to the network node 30, at least one control message 21 comprising information associated with the obtained one or more D2D transmissions. The resource allocation information enables the network node e.g. to restrict use of resources potentially subject to D2D interference when allocating resources for D2D and/or cellular traffic in the network node 30. The control message is e.g. an interference report or a measurement report.

According to one aspect, the at least one control message 21 further comprises synchronization information relating to at least one obtained D2D transmission. Synchronization information may be used in order to mitigate interference by aligning or not aligning D2D transmissions. According to one aspect, the synchronization information comprises at least one time offset between a time reference of the network node 30 and least one obtained D2D transmission.

According to one aspect, the at least one control message 21 further comprises resource allocation information relating to at least one obtained D2D transmission. Synchronization information may be used when allocating resources as explained above.

According to some aspects of this disclosure, the D2D device only signals some of the obtained D2D transmissions to the serving network node. This implies that the D2D device signals some of the retrieved information to the serving cell eNodeB e.g. the control message comprises information about obtained wireless devices 10a, 10b supporting D2D communication 10a, 10b that are served by neighbor cells 35b or cluster heads 10'.

According to another aspect, the control message 21 only comprises information about wireless devices 10a, 10b supporting D2D communication or D2D resources not known by the network node. D2D resources are resources allocated for D2D communication. In this case, the network node has informed the D2D device about known D2D resources.

Alternatively, the control message 21 comprises information about newly obtained devices wireless devices 10a, 10b supporting D2D communication and/or D2D resources. This alternative implies e.g. that the D2D device will only report resources the first time it obtains them.

Figure 3:
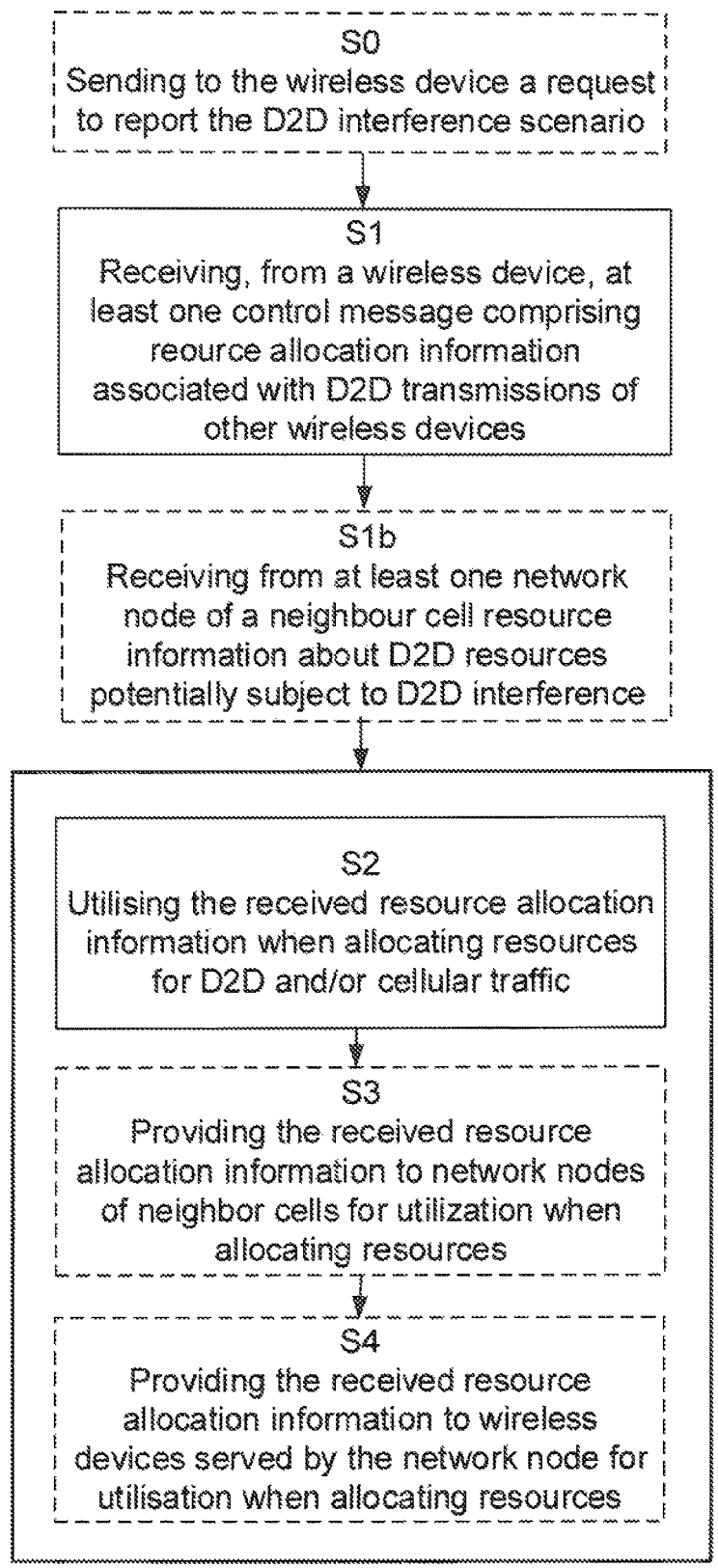
FIG. 3 is a flow chart illustrating the proposed method performed in a network node.

As described in relation to FIG. 3, different solutions can be envisioned for selecting which D2D devices and when they should report information about neighbor D2D devices D2D resources. According to one aspect, the network node 30 sends S0 a request for the wireless device to report the present D2D interference scenario to the D2D device 10. According to this aspect, the method in a wireless device further comprises, receiving 5101 from the network node 30 a request for the wireless device to report the present D2D interference scenario to the D2D device 10. For example the wireless device 10 is requested to report D2D interference measurements, wherein the request triggers the reporting of obtained wireless devices 10a, 10b supporting D2D communication to the network node 30.

In another example, the D2D device autonomously reports to the network the D2D interference scenario, when a variation in such interference scenario occurs. According to this aspect, the method in a wireless device further comprises, detecting S102 a variation in interference, also referred to as an event, wherein the detection of a variation triggers the reporting of obtained transmissions from wireless devices 10a, 10b supporting D2D communication, to the network node 30.

In one example a new event similar to the handover event defined in WCDMA/LTE today is defined. The event not related to a particular handover situation but related to detection of D2D resources associated with a neighboring cell or cluster head in case outside network coverage. In LTE/WCDMA once a power of a neighboring cell becomes x dB stronger than the serving cell, a handover event is triggered. The corresponding events are labeled 1A, 1B, 1C etc. in WCDMA and A1, A2, A3 in LTE. A similar implementation may be used here. For example, once a new device is detected, a "D2D device event", say "event K" meaning e.g. that a D2D sync signal is detected with a signal strength y dB relative a value. According to this example, this event is used to trigger the wireless device to report a present D2D interference scenario. According to this aspect, the method in a wireless device further comprises, detecting an event corresponding detection of a D2D transmission, wherein the detection triggers a report of information associated with detected D2D transmissions to the network node 30.

In any of the above cases the obtaining of D2D transmissions and the reporting may be performed at moments close in time or at separate points in time. Hence, the trigger may trigger the obtaining and a following report. Alternatively the measurements or detections are done continuously and the reporting is triggered as described above.

As described above the network node uses the received information for allocating resources. However, the wireless device may also receive D2D information from the serving network node. Hence, according to one aspect, the method in a wireless device further comprises, receiving S13 from the network node 30, information about D2D resources, known to the network node 30, being used by wireless devices 10a, 10b supporting D2D communication, served by neighbor cells 35b or cluster heads 10'. This information may be used e.g. when allocating resources for D2D transmissions, whereby a preceding search may be avoided or at least reduced. Hence power consumption in the D2D device is reduced.

Figure 5:
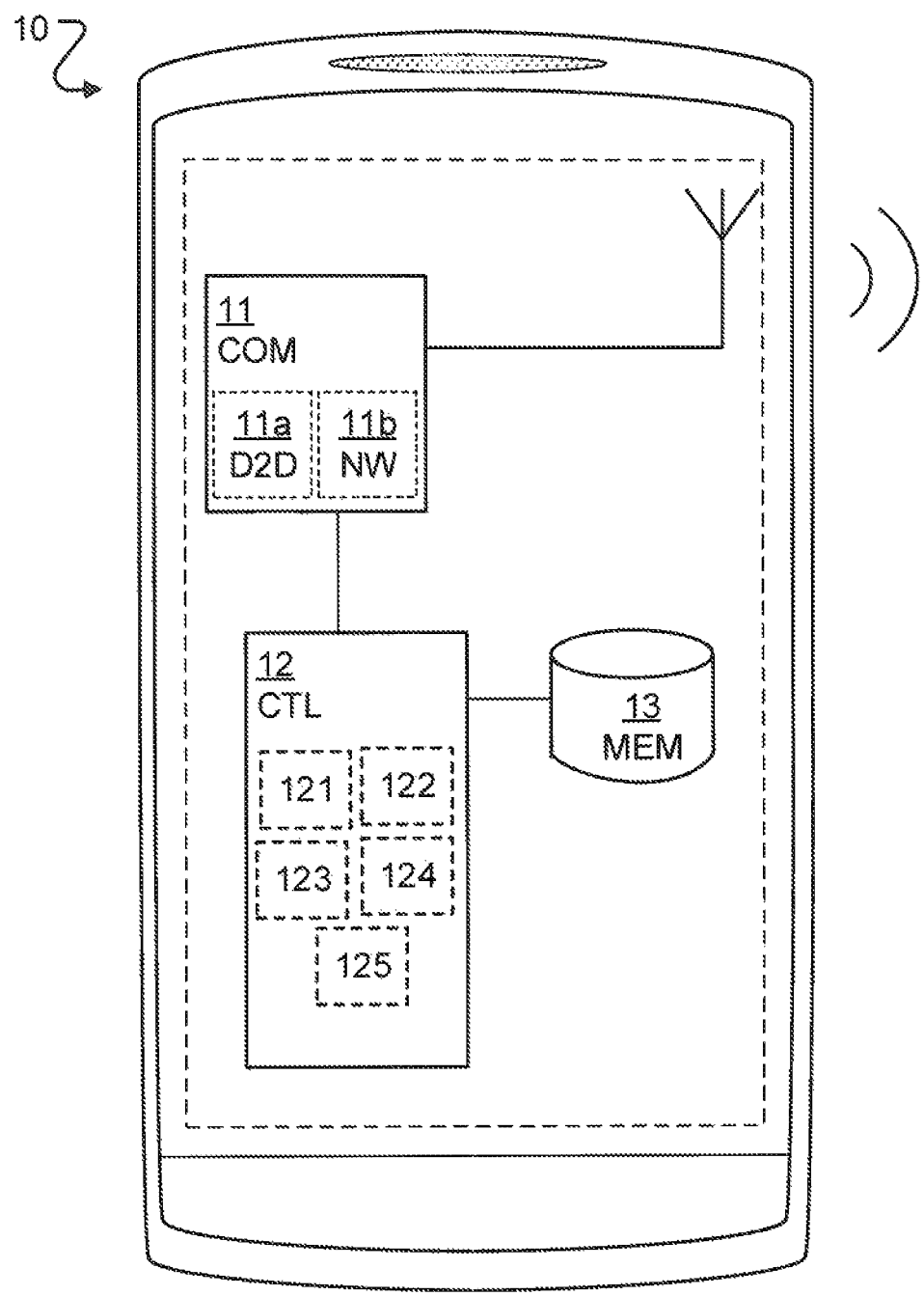
FIG. 5 is a schematic diagram illustrating a wireless device.

Turning now to FIG. 5, a schematic diagram illustrating some modules of an exemplary embodiment of a D2D device 10 configured to of enabling interference mitigation. In this application a D2D device 10 is any wireless device able to wirelessly connect to other D2D devices using D2D communication. The D2D device 10 is typically user equipment, UE, such as a smartphone or a M2M device. The D2D device comprises a radio communication interface 11 and a processing circuitry 12.

The controller, CTL, or a processing circuitry 12 may be constituted by any suitable Central Processing Unit, CPU, microcontroller, Digital Signal Processor, DSP, etc. capable of executing computer program code. The computer program may be stored in a memory, MEM 13. The memory 13 can be any combination of a Read And write Memory, RAM, and a Read Only Memory, ROM. The memory 13 may also comprise persistent storage, which, for example, can be any single one or combination of magnetic memory, optical memory, or solid state memory or even remotely mounted memory.

The radio communication interface 11 configured for communication with the network node 30 in a cellular network, and for D2D communication with other D2D devices. The node typically comprises several communication interface modules, e.g. D2D interface module 11a and a LTE communication interface module 11b.

According to one aspect the disclosure further relates to the above mentioned computer program, comprising computer readable code which, when run on a wireless device, causes the node to perform any of the aspects of the method described above. When the computer readable code is run in the processing circuitry 11 of the wireless device 10, it causes the wireless device 10 to obtain, using the radio communication interface 101, one or more D2D transmissions of other D2D devices 10a, 10b, and to send, using the radio communication interface 101, to the network node 30, at least one control message 21 comprising information associated with the obtained one or more D2D transmissions and thereby enabling e.g. restricted use of resources potentially subject to D2D interference when allocating resources for D2D and/or cellular traffic in the network node 30.

According to one aspect of the disclosure the processing circuitry 12 comprises one or several of:

an obtainer 121 configured to obtain, using the radio communication interface, one or more D2D transmissions of other D2D devices, a sending module 122 configured to send, using the radio communication interface, to the network node, at least one control message comprising information associated with the obtained one or more D2D transmissions.

According to one aspect the disclosure the processing circuitry 12 further comprises a detector 123 configured to detect an event triggering an interference report.

According to one aspect the disclosure the processing circuitry 12 further comprises a first receiver module 124 configured to from the network node a control message requesting the wireless device to report the present D2D interference scenario to the D2D device 10.

According to one aspect the disclosure the processing circuitry 12 further comprises a second receiver module 125 configured to receive from the network node, information about D2D resources, known to the network node, being used by D2D devices served by neighbor cells or cluster heads.

The obtainer 121, the detector 123, the sending module 122 and the first and second receiver modules 124, 125 are implemented in hardware or in software or in a combination thereof. The modules 121, 122, 123, 124, 125 are according to one aspect implemented as a computer program stored in a memory 13 which run on the processing circuitry 12. The wireless device 10 is further configured to implement all the aspects of the disclosure as described in relation to the methods above. The processing circuitry 12 also comprises the corresponding modules.

Figure 6:
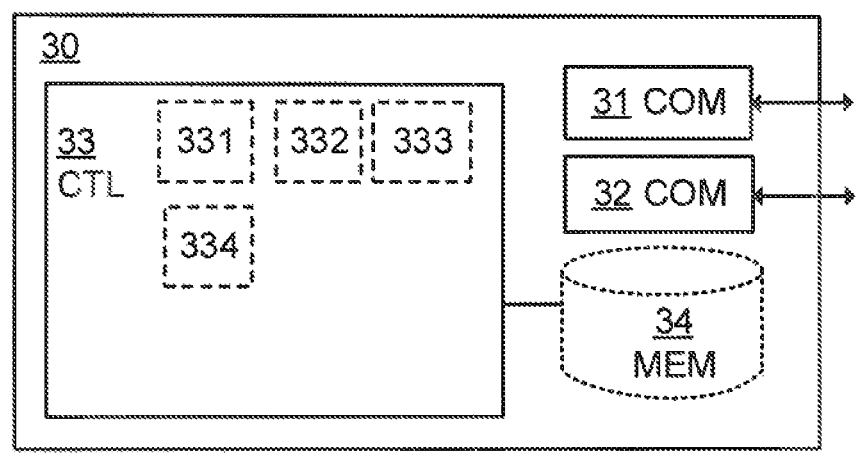
FIG. 6 is a schematic diagram illustrating a network node.

Turning now to FIG. 6, a schematic diagram illustrating some modules of an exemplary embodiment of a network node 30 being configured for interference mitigation, will be described. In this application the term network node is generally used. A radio network module is any node in a cellular network being configured to communicate with wireless devices over a radio access technology. The network module is e.g. an eNodeB in a LTE network. The network node comprises a radio communication interface 31, a network communication interface 32 and processing circuitry 33.

The radio communication interface 31 is configured for communication with wireless devices, such as wireless devices, within reach of the network node over a cellular communication technology.

The network communication interface 32 configured for communication with other network nodes. This communication is often wired e.g. using fiber. However, it may as well be wireless. The connection between network nodes is generally referred to as the backhaul 40.

The controller, CTL, or a processing circuitry 33 may be constituted by any suitable Central Processing Unit, CPU, microcontroller, Digital Signal Processor, DSP, etc. capable of executing computer program code. The computer program may be stored in a memory, MEM 34. The memory 34 can be any combination of a Read And write Memory, RAM, and a Read Only Memory, ROM. The memory 34 may also comprise persistent storage, which, for example, can be any single one or combination of magnetic memory, optical memory, or solid state memory or even remotely mounted memory.

When the above-mentioned computer program code is run in the processing circuitry 33 of the network node 30, it causes the network node 30 to receive, using the radio communication interface, from a D2D device 10, at least one control message 21 comprising information associated with, by the D2D device obtained, D2D transmissions of other D2D devices 10a, 10b, and to utilize the received information when allocating resources and/or providing the received information to network nodes 30a of neighbor cells and/or to wireless devices served by the network node 30 for utilization when allocating resources.

According to one aspect of the disclosure the controller comprises one or several of:

a first receiver module 331 configured to receive, from a D2D device 10, at least one control message 21 comprising information associated with, by the D2D device obtained, D2D transmissions of other D2D devices 10a, 10b, and a control module 332 configured to utilizing S2 the received information when allocating resources and/or providing S3 the received information to network nodes 30a of neighbor cells and/or to wireless devices served by the network node 30 for utilization when allocating resources.

According to one aspect the network node 30 is further adapted to send S0 to the D2D device 10 a request to report the D2D interference scenario. According to one aspect the controller 33 comprises a transmitter module 333 configured for this purpose.

According to one aspect the network node 30 is further adapted to receive S1b from at least one network node 30a of a neighbor cell resource information about D2D resources potentially subject to D2D interference. According to one aspect the controller 33 comprises a second receiver module 334 configured for this purpose.

The first and second receiver modules 331, 334, the control module 332 and the transmitter module 333 are implemented in hardware or in software or in a combination thereof. The modules 331, 332, 333, 334, are according to one aspect implemented as a computer program stored in the memory 34 which run on the processing circuitry 33. The network node 30 is further configured to implement all the aspects of the disclosure as described in relation to the methods above.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, discovery signal device, or repeater. A radio network node herein may comprise a radio network node operating in one or more frequencies or frequency bands. It may be a radio network node capable of CA. It may also be a single- or multi-RAT node. A multi-RAT node may comprise a node with co-located RATs or supporting multi-standard radio (MSR) or a mixed radio network node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method performed in a network node in a cellular communication system, the network node serving a wireless device supporting device-to-device (D2D) communication, the method comprising the network node:
   receiving, from the wireless device, at least one control message comprising resource allocation information associated with D2D transmissions of other wireless devices, which transmissions are obtained by the wireless device, and synchronization information relating to at least one obtained D2D transmission; and
   allocating resources for D2D transmissions based on the received resource allocation information.

2. The method of claim 1, wherein the at least one control message defines a set of resources configured, by neighbor devices, for potentially transmitting different D2D signals.

3. The method of claim 1, wherein the allocating resources for D2D transmissions based on the received resource allocation information comprises at least one of the following:
   restricting use of the resources potentially subject to D2D interference when allocating resources for D2D and/or cellular traffic in the network node;
   allocating resources so as to reduce overlap between resources allocated to D2D traffic and resources allocated to cellular traffic; and
   coordinating resources of at least one wireless device to facilitate switching between reception from and/or transmission to other wireless devices.

4. The method of claim 1, wherein the synchronization information comprises at least one time offset between a time reference of the network node and least one obtained D2D transmission.

5. The method of claim 1, further comprising at least one of the following:
   sending the wireless device a request for the wireless device to report a D2D interference scenario;
   providing the received resource allocation information to network nodes of neighbor cells for utilization when allocating resources; and
   providing the received resource allocation information to wireless devices served by the network node for utilization when allocating resources.

6. The method of claim 1:
   further comprising receiving, from at least one network node of a neighbor cell, resource information about D2D resources potentially subject to D2D interference; and
   wherein the allocating resources for D2D transmissions based on the received resource allocation information comprises allocating resources in the network node based on both information received from wireless devices supporting D2D communication and on information received from network nodes of a neighbor cells.

7. A method, performed in a wireless device supporting device-to-device (D2D) communication, the wireless device being served by a network node in a cellular communication system, the method comprising the wireless device:
   obtaining one or more D2D transmissions of other wireless devices supporting D2D communication; and
   sending, to the network node, at least one control message comprising synchronization information pertaining to the obtained one or more D2D transmissions and resource allocation information associated with the obtained one or more D2D transmissions.

8. The method of claim 7, wherein the at least one control message defines a set of resources, configured by neighbor devices, for potentially transmitting different D2D signals.

9. The method of claim 7, wherein the obtaining comprises at least one of the following:
   scanning the radio environment for synchronization reference signals transmitted by other network nodes or wireless devices supporting D2D communications; and
   reading control information, transmitted by neighbor network nodes, regarding resource allocation.

10. The method of claim 7, wherein the control message comprises information about wireless devices supporting D2D communication or D2D resources not known by the network node.

11. The method of claim 7, wherein the control message comprises at least one of the following:
   information about newly obtained wireless devices supporting D2D communications and/or D2D resources; and
   information about other wireless devices supporting D2D communications that are served by neighbor cells or cluster heads.

12. The method of claim 7, further comprising receiving, from the network node, a request for the wireless device to report the D2D interference scenario.

13. The method of claim 7, further comprising detecting a variation in interference, wherein detection of a variation triggers the reporting of information associated with obtained D2D communications to the network node.

14. The method of claim 7, further comprising receiving, from the network node, information about D2D resources, known to the network node, being used by wireless devices supporting D2D communications served by neighbor cells or cluster heads.

15. The method of claim 7, wherein the control message is an interference report or a measurement report.

16. The method of claim 7, wherein the at least one control message comprises at least one time offset between a time reference of the network node and least one obtained D2D transmission.

17. The method of claim 7, wherein the at least one control message further comprises resource allocation information relating to at least one obtained D2D transmission.

18. A wireless device supporting D2D communication and configured to enable interference mitigation, the wireless device comprising:
   a radio communication interface configured to communicate with a network node, and for D2D communication with other wireless devices supporting D2D communications; and
   processing circuitry configured to cause the wireless device to:
      obtain, using the radio communication interface, one or more D2D transmissions of other wireless devices supporting D2D communications; and
      send, to the network node and using the radio communication interface, at least one control message comprising synchronization information pertaining to the obtained one or more D2D transmissions and resource allocation information associated with the obtained one or more D2D transmissions.

19. A network node, in a cellular communication system, the network node configured for interference mitigation, the network node comprising:
   a radio communication interface configured for communication with wireless devices supporting D2D communication;
   a network communication interface configured for communication with other network nodes; and
   processing circuitry configured to cause the network node to:
      receive, from a wireless device and using the radio communication interface, at least one control message comprising resource allocation information associated with D2D transmissions of other wireless devices, which transmissions are obtained by the wireless device, and synchronization information relating to at least one obtained D2D transmission; and
      allocate resources based on the received resource allocation information.

20. The network node of claim 19, wherein:
   the network node comprises a radio communication interface configured for communication with at least one network node of a neighbor cell; and
   the processing circuitry is configured to cause the network node to:
      receive, from the at least one network node of a neighbor cell, resource information about D2D resources potentially subject to D2D interference; and
      allocate the resources based on both information received from wireless devices supporting D2D communication and on information received from network nodes of a neighbor cells.

21. The wireless device of claim 18, wherein the processing circuitry is configured to cause the wireless device to detect a variation in interference, wherein detection of a variation triggers the reporting of information associated with obtained D2D communications to the network node.

* * * * *